(12) United States Patent
Qiu (10) Patent No.: US 10,292,432 B2
(45) Date of Patent: May 21, 2019

(54) ELECTRONIC CIGARETTE

(71) Applicant: Joyetech Europe Holding GmbH, Zug (CH)

(72) Inventor: Weihua Qiu, Jiangsu (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 0 days.

(21) Appl. No.: 15/699,400

(22) Filed: Sep. 8, 2017

(65) Prior Publication Data

US 2018/0070638 A1 Mar. 15, 2018

(30) Foreign Application Priority Data

Sep. 9, 2016 (CN) .......................... 2016 1 0814238

(51) Int. Cl.
| | |
|---|---|
| *A24F 13/00* | (2006.01) |
| *A24F 47/00* | (2006.01) |
| *H01M 10/46* | (2006.01) |
| *H02J 7/32* | (2006.01) |
| *H01M 2/10* | (2006.01) |

(52) U.S. Cl.
CPC ......... *A24F 47/008* (2013.01); *H01M 2/1055* (2013.01); *H01M 10/46* (2013.01); *H02J 7/32* (2013.01); *H01M 2220/30* (2013.01)

(58) Field of Classification Search
CPC ..................................................... A24F 47/008
USPC .................................................. 131/328–329
See application file for complete search history.

(56) References Cited

U.S. PATENT DOCUMENTS

| | | | |
|---|---|---|---|
| 8,975,764 B1 * | 3/2015 | Abehasera | ................ F03G 7/08 128/202.21 |
| 2013/0220315 A1 * | 8/2013 | Conley | ................. A24F 47/008 128/202.21 |
| 2018/0271152 A1 * | 9/2018 | Silvestrini | ............. A24F 47/008 |

* cited by examiner

*Primary Examiner* — Phuong K Dinh
(74) *Attorney, Agent, or Firm* — Novick, Kim & Lee, PLLC; Allen Xue (57) ABSTRACT

An electronic cigarette has a shell assembly, a power generation assembly mounted inside or outside the shell assembly, and a storage battery mounted inside the shell assembly. The power generation assembly has a microgenerator electrically connected with the storage battery and a power generation blade mounted on the microgenerator. External air drives the power generation blade to rotate. The rotation of the power generation blade drives the microgenerator to generate electricity, which is in turn stored in the storage battery. The electronic cigarette according to the present disclosure, by driving the rotation of the power generation blade with airflow, and drives the microgenerator to generate electricity so as to charge the storage battery and thus realize the object of recharging the battery and slowing down the power consumption of the battery.

15 Claims, 7 Drawing Sheets

ELECTRONIC CIGARETTE

CROSS REFERENCE TO RELATED APPLICATIONS

This application claims priority of Chinese Patent Application No. CN201610814238.7, filed on Sep. 9, 2016, the entirety of which is incorporated by reference herein.

FIELD

The present disclosure relates to the technical field of electronic cigarette, and more particularly, to an electronic cigarette comprising a power generation assembly.

BACKGROUND

An electronic cigarette comprises an atomizing device and a power supply device. In the related arts, the electronic cigarette usually utilizes a battery provided inside the electronic cigarette as its power supply device to provide power to the atomizing device. When the power in the battery runs out, the battery may be connected to a fixed power supply via a charger to charge. However, if a user of the electronic cigarette is in the open or on a trip and could not find a charger for charging or a suitable charger to connect to the battery of the electronic cigarette to a fixed power source, it is impossible to charge the battery of the electronic cigarette, causing great inconvenience to the user of the electronic cigarette.

Meanwhile, with improving functions of the electronic cigarette, battery power consumption significantly increase in all kinds of the batteries of the current electronic cigarettes on the market, be it soft-package batteries or steel-shell batteries. Particularly, if the user prefers smoking with an effect under high power, the power consumption of the battery will be much greater, and the power in the batteries will soon run out. Although the electronic cigarette itself is provided with a charging function, there may not be a suitable place for charging at anytime and anywhere. Consequently, since the current battery itself cannot be further improved, there is a need to effectively mitigate the power consumption of the batteries while not affecting its normal use.

SUMMARY

In view of the above problems, there is a need to provide an electronic cigarette, which is able to generate electricity by itself during its use, so as to mitigate the power consumption of the battery.

An electronic cigarette is provided, comprising a shell assembly, a power generation assembly mounted inside or outside the shell assembly, and a storage battery mounted inside the shell assembly. The power generation assembly comprises a microgenerator electrically connected with the storage battery and a power generation blade mounted on the microgenerator. External air drives the power generation blade to rotate. The rotation of the power generation blade drives the microgenerator to generate electricity, and the electricity generated by the microgenerator is stored in the storage battery.

Further, the power generation assembly is mounted inside the shell assembly. The power generation assembly further comprises a power generation airflow passage, and the shell assembly defines a ventilation hole communicating with one end of the power generation airflow passage. Both the microgenerator and the power generation blade are mounted inside one end of the power generation airflow passage proximal to the ventilation hole. External air flows into the one end of the power generation airflow passage via the ventilation hole, driving the power generation blade to rotate, and then flows out from the other end of the power generation airflow passage.

Further, the power generation assembly further comprises a first ventilation conduit which is arranged above the power generation blade and has an opening at one end directly facing the power generation blade. The inner cavity of the first ventilation conduit constitutes a part of the power generation airflow passage. The shell assembly comprises a housing and a bottom cover mounted at one end of the housing. The ventilation hole is defined on the bottom cover. Both the power generation assembly and the storage battery are mounted inside the housing.

Further, the shell assembly further comprises a connector which is located at the end of the housing opposite to the bottom cover and has a second mounting hole. An end of the first ventilation conduit opposite to the power generation blade is located inside the second mounting hole.

Further, the power generation assembly further comprises a sleeve mounted inside the second mounting hole. The end of the second ventilation conduit opposite to the power generation blade is located inside the sleeve, and the sleeve defines a sleeve hole which communicates with the inner cavity of the first ventilation conduit.

Further, the electronic cigarette further comprises an atomizing assembly mounted inside the housing. The atomizing assembly comprises an atomizing passage spaced away from the power generation airflow passage and an atomizer head electrically connected with the storage battery. The atomizing passage comprises an air inlet passage and a smoke outlet passage. Both the air inlet passage and the smoke outlet passage communicate with the atomizer head.

Further, the atomizing assembly further comprises a second ventilation conduit and an atomizing air outlet conduit inserted in the second ventilation conduit. A lower end of the second ventilation conduit is connected with the atomizer head, and an upper end of the second ventilation conduit is connected to the connector. An inner cavity of the second ventilation conduit is consisted of an atomizing air outlet segment and an atomizing air inlet segment. The atomizing air outlet segment is located above the atomizing air inlet segment and communicates with the inner cavity of the atomizing air outlet conduit to define the smoke outlet passage. The space between the atomizing air inlet segment and the atomizing air outlet conduit defines the air inlet passage.

Further, the diameter of the atomizing air inlet segment is larger than that of the atomizing air outlet segment. A connecting hole is defined at a junction of the atomizing air outlet segment and the atomizing air inlet segment. One end of the atomizing air outlet conduit is mounted inside the connecting hole, and the other end of the atomizing air outlet conduit is spaced away from the atomizer head.

Further, the housing defines a first air inlet opening, and the connector defines a second air inlet opening communicating with the first air inlet opening. The second ventilation conduit defines an atomizing air inlet opening which communicates with the second air inlet opening and the air inlet passage, respectively.

Further, the electronic cigarette further comprises a mouthpiece mounted on the housing. The mouthpiece defines a first through hole and a second through hole spaced away from each other. The first through hole communicates with the atomizing air outlet segment of the second ventilation conduit, and the second through hole communicates with the inner hole of the second ventilation conduit.

Another electronic cigarette is provided, comprising a power generation assembly. The power generation assembly comprises a microgenerator, a power generation blade mounted on the microgenerator, and a power generation airflow passage. Both the microgenerator and the power generation blade are mounted inside one end of the power generation airflow passage. External air flows into the one end of the power generation airflow passage to drive a rotation of the power generation blade and then flows out from the other end of the power generation airflow passage. The rotation of the power generation blade drives the microgenerator to generate electricity.

Further, the electronic cigarette further comprises a shell assembly configured to receive the power generation assembly and define a ventilation hole communicating with the one end of the power generation airflow passage.

Further, the shell assembly comprises a housing and a bottom cover mounted at an end of the housing. The ventilation hole is defined on the bottom cover. The power generation assembly is mounted inside the housing.

Further, the power generation assembly further comprises a first ventilation conduit which is arranged above the power generation blade and has an opening at one end directly facing the power generation blade. An inner cavity of the first ventilation conduit constitutes a part of the power generation airflow passage.

Further, the shell assembly further comprises a connector located at an end of the housing opposite to the bottom cover and defining a second mounting hole. An end of the first ventilation conduit opposite to the power generation blade is located in the second mounting hole.

Further, the electronic cigarette further comprises a storage battery electrically connected to the microgenerator. The electricity generated by the microgenerator is stored in the storage battery.

Further, the electronic cigarette further comprises an atomizing assembly. The atomizing assembly includes an atomizing passage spaced away from the power generation airflow passage and an atomizer head electrically connected with the storage battery.

Further, the atomizing passage comprises an air inlet passage and a smoke outlet passage. Both the air inlet passage and the smoke outlet passage communicate with the atomizer head.

Further, the electronic cigarette further comprises a mouthpiece. The mouthpiece defines a first through hole and a second through hole spaced away from each other. The first through hole communicates with the atomizing passage, and the second through hole communicates with the power generation airflow passage.

Further, the electronic cigarette further comprises an electronic control component which is electrically connected to the atomizing assembly and the storage battery.

In the electronic cigarette according to the present disclosure, two independent airflow passages are provided. When the user sucks the mouthpiece in a normal case, the airflow passage passing through the atomizing assembly is the atomizing passage, generating smoke for smoking of the user. The other passage passing through the power generation assembly is the power generation airflow passage, utilizing the airflow generated as the user sucks the mouthpiece to drive the power generation blade to rotate, and thus drive the microgenerator to generate electricity to charge the storage battery. As a result, the object of recharging the battery and mitigating the power consumption of the battery is fulfilled.

| | | |
|---|---|---|
| shell assembly 1 | electrode column 21 | power generation airflow passage 30 |
| housing 11 | atomizer head 22 | microgenerator 31 |
| first air inlet opening 111 | first external thread 221 | power generation blade 32 |
| bottom cover 12 | first ventilation conduit 23 | second ventilation conduit 33 |
| ventilation hole 121 | first internal thread 231 | sleeve 34 |
| connector 13 | second external thread 232 | sleeve hole 35 |
| first mounting hole 131 | atomizing air outlet segment 233 | storage battery 4 |
| boss 134 | atomizing air inlet segment 234 | electronic control component 5 |
| second internal thread 135 | connecting hole 235 | PCB 51 |
| second mounting hole 132 | atomizing air inlet opening 236 | switch button 52 |
| second air inlet opening 133 | atomizing air outlet conduit 24 | adjusting button 53 |
| atomizing assembly 2 | liquid storage tube 25 | USB interface 54 |
| atomizing passage 20 | first sealing member 251 | mouthpiece 6 |
| air inlet passage 201 | second sealing member 252 | first through hole 61 |
| smoke outlet passage 202 | power generation component 3 | second through hole 62 |

DETAILED DESCRIPTION OF PREFERRED EMBODIMENTS

The above objects, features and advantages of the present disclosure will become more apparent from the following detailed description of the preferred embodiments of the present disclosure made with reference to the drawings. Lots of specific details are described in the following description to facilitate a thorough understanding of the present disclosure. It is noted that the disclosure can be implemented in many other ways different from those described herein, and that similar improvements can be made by those skilled in the art without departing from the spirit of the disclosure, and that the disclosure is not limited to the specific embodiments disclosed below.

It is noted that when an element is referred to as being "fixed to" another element, it may be directly on another element or there may also be an intermediate element. When an element is considered to be "connected" to another element, it may be connected directly to another element or there may also be an intermediate element.

Unless otherwise defined, all technical and scientific terms used herein have the same meaning as those commonly understood by those skilled in the art. The terminology used herein in the specification of the present disclosure is for the purpose of describing the embodiments only and is not intended to limit the disclosure. The term "and/or" as used herein includes any and all combinations of one or more of the associated listed items.

Figure 1:
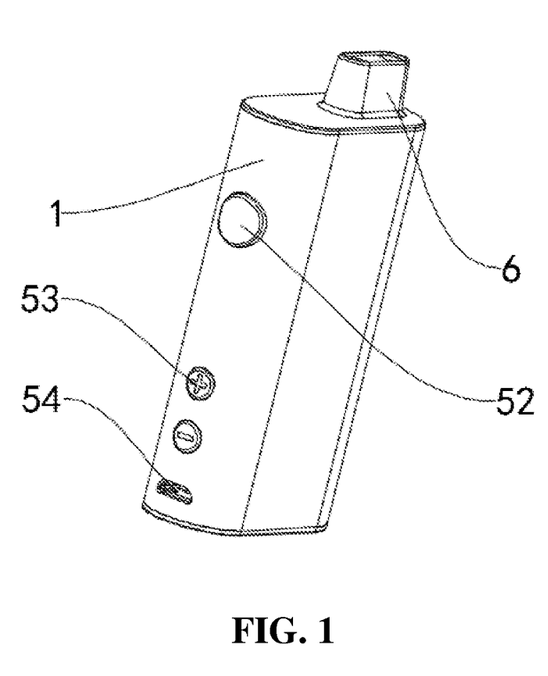
FIG. 1 is a perspective schematic view of an electronic cigarette according to an embodiment of the present disclosure.
Figure 2:
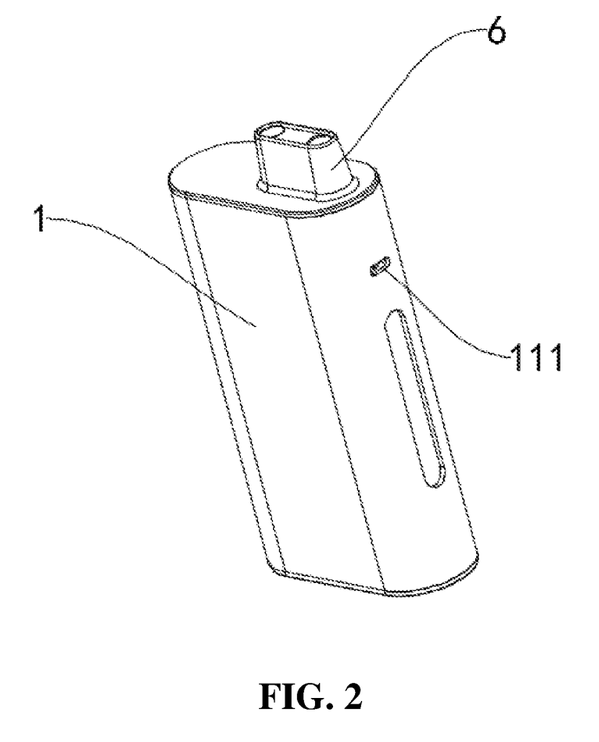
FIG. 2 is a perspective schematic view from another direction of the electronic cigarette shown in FIG. 1.
Figure 3:
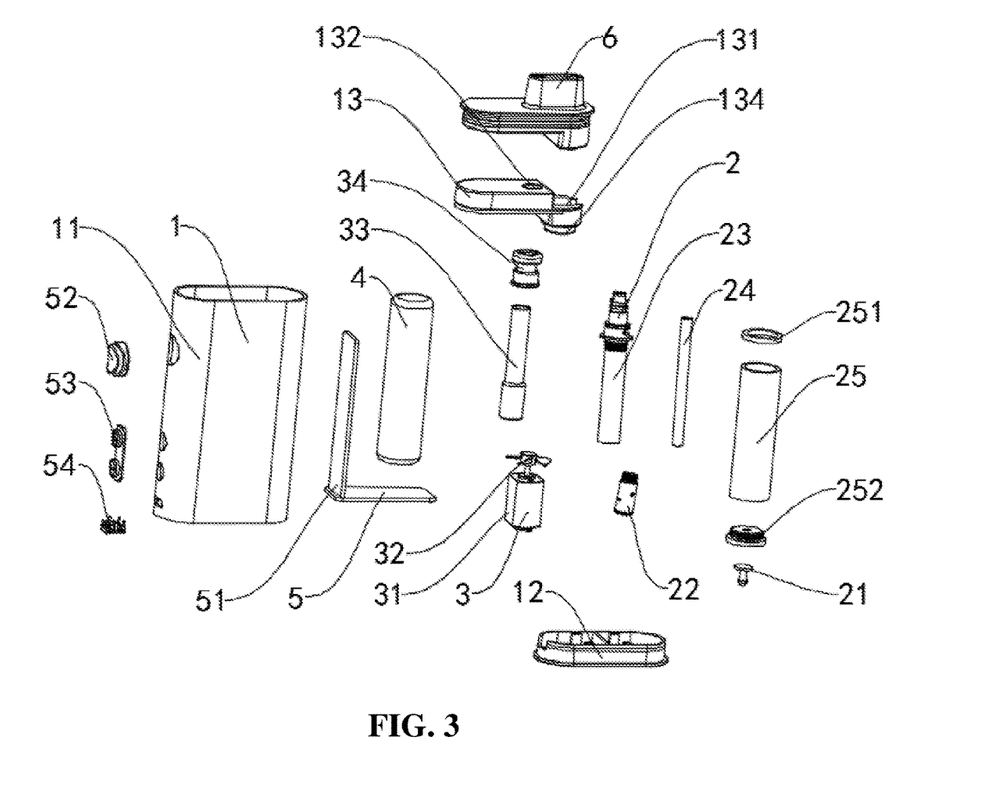
FIG. 3 is an exploded schematic view of the electronic cigarette shown in FIG. 1.

Please refer to FIGS. 1 to 3, an electronic cigarette is provided in an embodiment of the present disclosure, wherein the electronic cigarette comprises a shell assembly 1, an atomizing assembly 2, a power generation assembly 3, a storage battery 4, an electronic control component 5, and a mouthpiece 6. The atomizing component 2, the power generation assembly 3, and the storage battery 4 are mounted inside the shell assembly 1, respectively. The storage battery 4 is electrically connected to the atomizing assembly 2 and the power generation assembly 3, respectively. The electronic control component 5 is electrically connected to the atomizing assembly 2 and the storage battery 4, respectively. The mouthpiece 6 is mounted on the top end of the shell assembly 1.

In this embodiment, atomizer and battery device of the electronic cigarette is integrated together. In another embodiment (not shown) provides a split type, electronic cigarette, which comprise an atomizer and a battery device connected to the atomizer. The atomizer comprises the atomizing assembly 2, and the battery device comprises the storage battery 4 and the electronic control component 5. The power generation assembly 3 is mounted inside the atomizer. It can be appreciated that, the power generation assembly 3 may be mounted inside the battery device. It can be appreciated that, the atomizer is detachable connected to the battery device.

Figure 4:
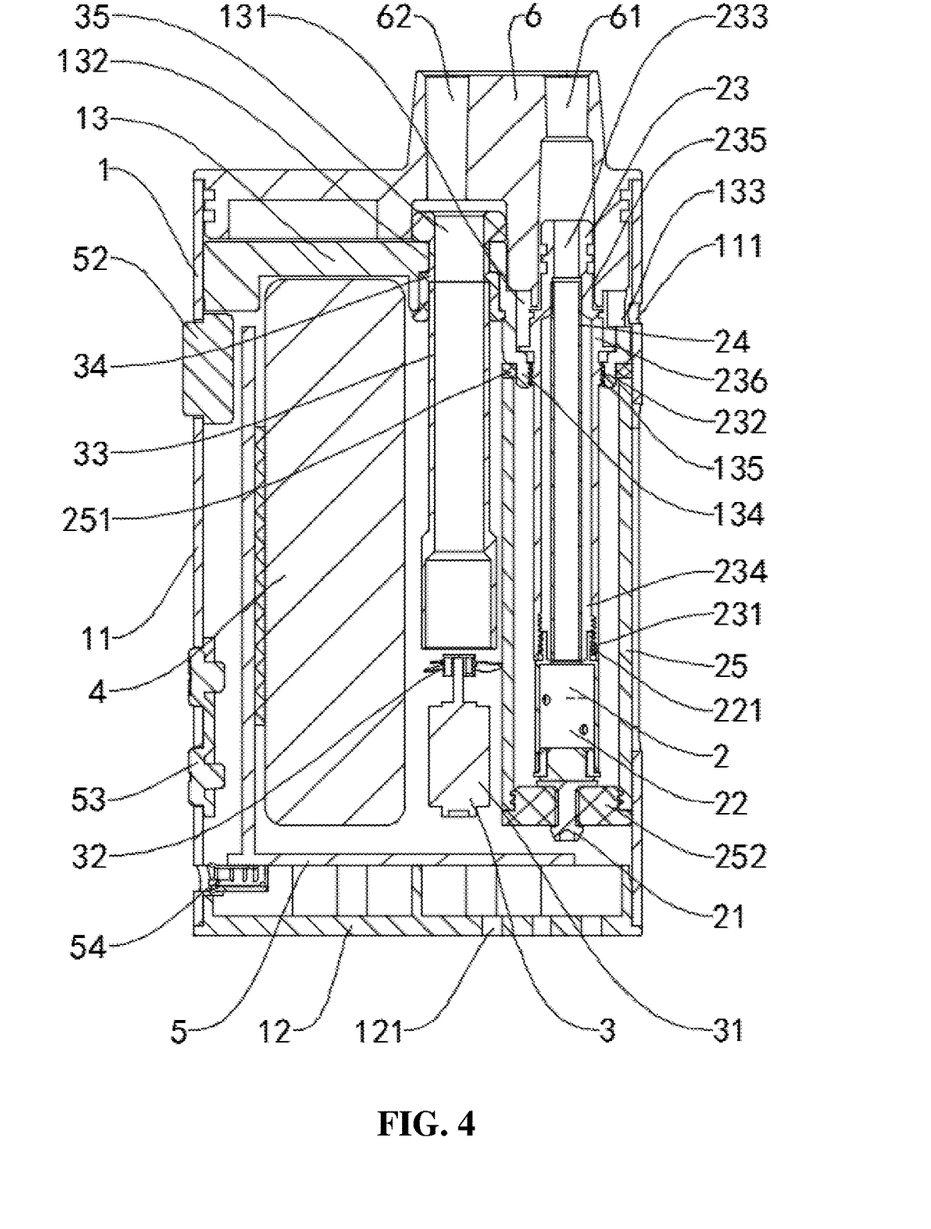
FIG. 4 is a sectional view of the electronic cigarette shown in FIG. 1.
Figure 5:
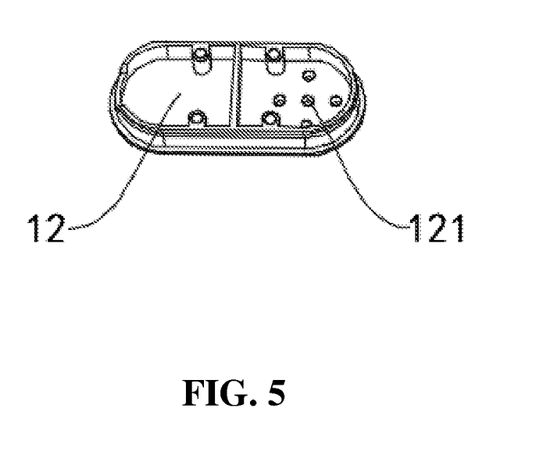
FIG. 5 is a perspective schematic view of the bottom cover of the electronic cigarette shown in FIG. 3.

As shown in FIGS. 3 and 4, the shell assembly 1 comprises a housing 11, a bottom cover 12 and a connector 13, wherein the bottom cover 12 and the connector 13 are provided at opposite ends of the housing 11. The housing 11 defines a first air inlet opening 111. As shown in FIG. 5, the bottom cover 12 defines a ventilation hole 121. One end of the connector 13 defines a first mounting hole 131 for mounting the atomizing assembly 2 and a second mounting hole 132 for mounting the power generation assembly 3. The first mounting hole 131 and the second mounting hole 132 are spaced away from each other. The lateral wall of the connector 13 close to the first mounting hole 131 defines a second air inlet opening 133 which communicates with the first air inlet opening 111. The second air inlet opening 133 extends through the partition wall between the second air inlet opening 133 and the first mounting hole 131, and then communicates with the first mounting hole 131. The connector 13 extends downwards from the position where the first mounting hole 131 is located to form a boss 134 which may have an annular shape. An interior side of the boss 134 defines a second internal thread 135, and an inner cavity of the boss 134 communicates with the first mounting hole 131.

In this embodiment, the ventilation hole 121 is provided with five circular holes in total. It can be appreciated that, the number of the ventilation hole 121 may be one or more, and the shape of the ventilation hole 121 is not limited only to circular holes, but also may be rectangular holes or other shapes, as long as the ventilation function can be realized, to allow the external airflow to enter the electronic cigarette.

The atomizing assembly 2 comprises an electrode column 21, an atomizer head 22, a second ventilation conduit 23, and an atomizing air outlet conduit 24. The electrode column 21 is connected to one end of the atomizer head 22. The atomizer head 22 is provided with a first external thread 221 at one end opposite to the electrode column 21. The second ventilation conduit 23 is provided with a first internal thread 231 at one end. The atomizer head 22 is connected to the second ventilation conduit 23 by the thread engagement between the first internal thread 231 and the first external thread 221. The second ventilation conduit 23 is provided with a second external thread 232 at the other end, and is connected to the connector 13 by the thread engagement between the second internal thread 135 and the second external thread 232.

In this embodiment, the electrode column 21 is a positive column. The second ventilation conduit 23 and the housing 11 function as the negative column.

The inner cavity of the second ventilation conduit 23 consists of an atomizing air outlet segment 233 and an atomizing air inlet segment 234, wherein the atomizing air outlet segment 233 is located at the upper end of the second ventilation conduit 23, and the atomizing air inlet segment 234 is located below the atomizing air outlet segment 233. The atomizing air inlet segment 234 has a diameter larger than that of the atomizing air outlet segment 233. The atomizing air inlet segment 234 defines a connecting hole 235 at the end closed to the atomizing air outlet segment 233, wherein the diameter of the connecting hole 235 is smaller than that of the atomizing air inlet segment 234. The atomizing air outlet conduit 24 has an outer diameter matching with the diameter of the connecting hole 235. One end of the atomizing air outlet conduit 24 is mounted inside the connecting hole 235. The inner cavity of the atomizing air outlet conduit 24 communicates with the atomizing air outlet segment 233. The other end of the atomizing air outlet conduit 24 extends downwards to the bottom of the second ventilation conduit 23 and is disposed adjacent to the atomizer head 22, with a gap between this end of the atomizing air outlet conduit 24 and the atomizer head 22. Both the inner cavity of the atomizing air outlet conduit 24 and the gap between the atomizing air outlet conduit 24 and the atomizing air inlet segment 234 communicate with the atomizer head 22. The part of the upper end of the second ventilation conduit 23 installed inside the connector 13 defines an atomizing air inlet opening 236 communicating with the second air inlet opening 133.

The atomizing assembly 2 comprises an atomizing passage 20. The atomizing passage 20 comprises an air inlet passage 201 and a smoke outlet passage 202. The air inlet passage 201 and the smoke outlet passage 202 both communicate with the atomizer head 22. The space between the atomizing air inlet segment 234 and the atomizing air outlet conduit 24 defines the air inlet passage 201, while the atomizing air outlet segment 233 communicates with the inner cavity of the atomizing air outlet conduit 24 to define the smoke outlet passage 202. The atomizing air inlet opening 236 also communicates with the air inlet passage 201.

The atomizing assembly 2 further comprises a liquid storage tube 25. One end of the liquid storage tube 25 is sleeved on the outer surface of the boss 134, and a first sealing member 251 is mounted between the liquid storage tube 25 and the bottom of the boss 134. A second sealing member 252 is mounted on the periphery of the middle part of the electrode column 21, and the other end of the liquid storage conduit 25 is mounted on the outer surface of the second sealing member 252. The second sealing member 252 may be made of silicone rubber. The atomizer head 22 located inside the liquid storage tube 25 is configured to atomize the tobacco liquid stored in the liquid storage tube 25.

Figure 6:
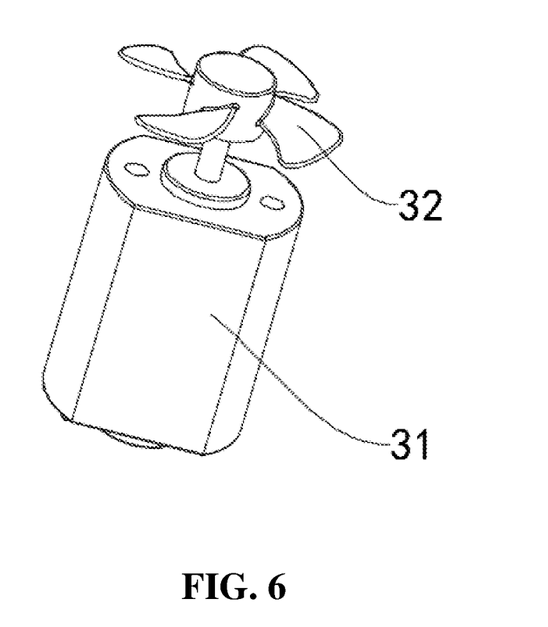
FIG. 6 is a perspective schematic view of the power generation assembly of the electronic cigarette shown in FIG. 3.

The power generation assembly 3 comprises a microgenerator 31, a power generation blade 32, a first ventilation conduit 33, and a sleeve 34. The sleeve may be made of silicone rubber. The microgenerator 31 is mounted inside the shell assembly 1. The power generation blade 32 is mounted on a rotary shaft of the microgenerator 31, and the specific mounting method is shown in FIG. 6. The first ventilation conduit 33 is mounted above the power generation blade 32, with the opening at one end of the first ventilation conduit 33 directly facing the power generation blade 32. The sleeve 34 has an outer diameter matching with the inner diameter of the second mounting hole 132 and is mounted within the second mounting hole 132. The other end of the first ventilation conduit 33 is located within the sleeve 34. The sleeve 34 defines a sleeve hole 35 that communicates with the inner cavity of the first ventilation conduit 33.

The power generation assembly 3 also comprises a power generation airflow passage 30 spaced away from the atomizing passage 20. In this embodiment, the gap between the bottom cover 12 and the atomizing assembly 2, the gap between the bottom cover 12 and the microgenerator 31, the gap between the bottom cover 12 and the storage battery 4, the gap between the microgenerator 31 and the atomizing assembly 2, the gap between the microgenerator 31 and the storage battery 4, and the inner cavity of the first ventilation conduit 33 together define the power generation airflow passage 30. Accordingly, the microgenerator 31 and the power generation blade 32 are mounted inside one end of the power generation airflow passage 30 close to the ventilation hole 121. The external air flows into one end of the power generation airflow passage 30 via the ventilation hole 121, drives the power generation blade 32 to rotate, and then flows out from the other end of the power generation airflow passage 30.

It can be appreciated that, when the end of the first ventilation conduit 33 which directly faces the power generation blade 32 extends downwards to the above of the ventilation hole 121 and surrounds around the periphery of the power generation blade 32 and the microgenerator 31 as a whole, the inner cavity of the first ventilation conduit 33 alone defines the power generation airflow passage 30.

It can be appreciated that, the microgenerator 31 and the power generation blade 32 can also be mounted on the outside of the shell assembly 1, wherein the rotation of the power generation blade 32 is directly driven by the external airflow to allow the microgenerator 31 to generate power. In this case, the power generation airflow passage 30 can be omitted.

The storage battery 4 is electrically connected to the microgenerator 31, and stores the electrical energy generated by the microgenerator 31.

The electronic control component 5 comprises a printed circuit board (PCB) 51 mounted inside the shell assembly. The PCB 51 is electrically connected to the storage battery 4 and the electrode column 21, respectively, and supply power from the storage battery 4 to the atomizer head 22, so as to supply power required for atomizing to the atomizer head 22.

The electronic control component 5 further comprises a switch button 52 and an adjusting button 53, both mounted on the lateral surface of the housing 11 and in contact with the corresponding functional parts on the PCB 51, configured to switch on/off or to adjust the operation of the atomizer head 22.

The electronic control component 5 further comprises a USB interface 54 configured to connect with external power source to charge the storage battery 4. The USB interface 54 is mounted at the bottom of the lateral surface of the housing 11 and electrically connected with the storage battery 4 via the PCB 51.

Figure 7:
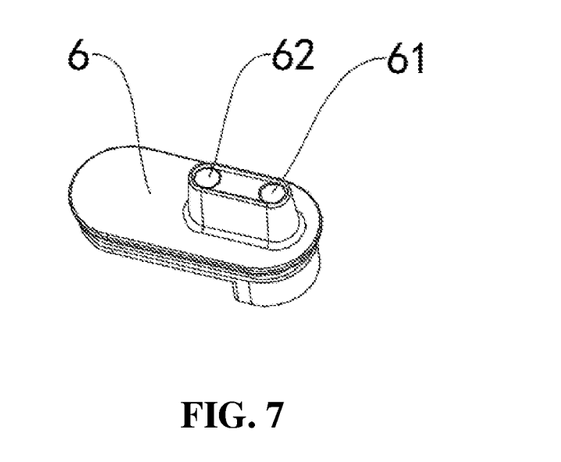
FIG. 7 is a perspective schematic view of the mouthpiece of the electronic cigarette shown in FIG. 3.
Figure 8:
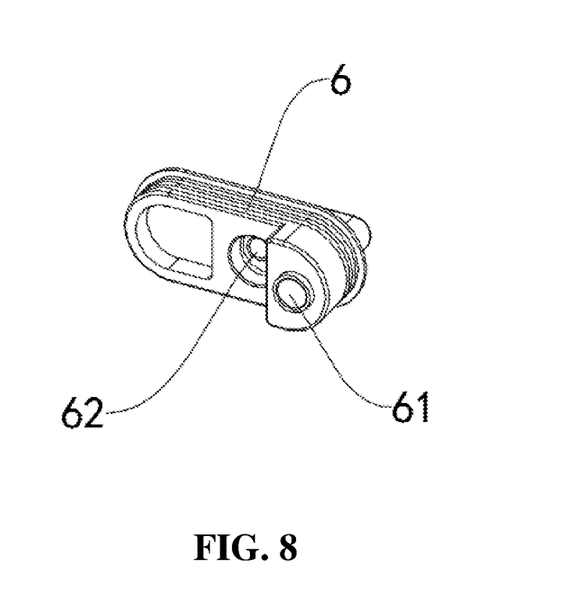
FIG. 8 is a perspective schematic view from another direction of the mouthpiece shown in FIG.

The mouthpiece 6 is mounted on the housing 11, as shown in FIGS. 7 and 8. The mouthpiece 6 defines a first through hole 61 and a second through hole 62 spaced away from each other. The first through hole 61 communicates with the atomizing air outlet segment 233 of the second ventilation conduit 23, and the second through hole 62 communicates with the first ventilation conduit 33 via the sleeve hole 35 of the sleeve 34.

In this embodiment, the atomizing passage 20 and the power generation airflow passage 30 are independent from each other. It can be appreciated that, in another embodiment (not shown), the atomizing passage 20 and the power generation airflow passage 30 may be communicate with each other. In one embodiment, the atomizing passage 20 and the power generation airflow passage 30 both communicate with the first through hole 61 or the second through hole 62. And one of the first through hole 61 and the second through hole 62 can be omitted. In another embodiment, the first air inlet opening 111, the second air inlet opening 133 and the atomizing air inlet opening 236 together constitute an air inlet. The atomizing passage 20 and the power generation airflow passage 30 both communicate with the air inlet or the ventilation hole 121, thus one of the air inlet and the ventilation hole 121 can be omitted. In still another embodiment (not shown), the atomizing assembly 2 and the power generation assembly 3 are both located in the atomizing passage 20 or the power generation airflow passage 30. Accordingly, the passage in which the atomizing module 2 and the power generating unit 3 are not mounted can be omitted.

Figure 9:
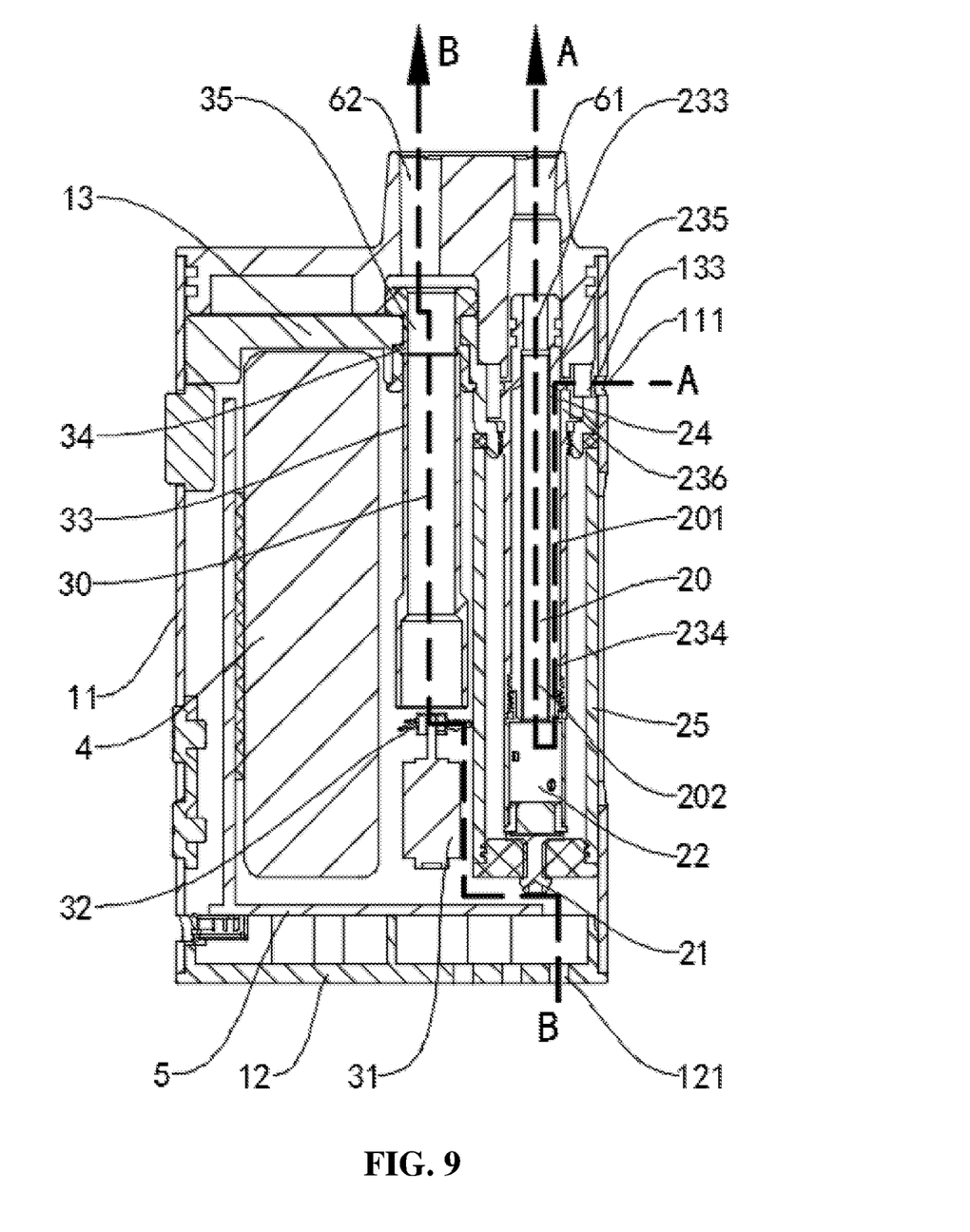
FIG. 9 is a schematic view of the airflow direction in the electronic cigarette shown in FIG. 1.

Please refer to FIG. 9, wherein A-A indicates the flow direction of the atomizing air of the electronic cigarette according to the embodiment of the present disclosure, and B-B indicates the flow direction of the power generation air of the electronic cigarette according to the embodiment of the present disclosure.

As the user sucks the mouthpiece 6, the external air flows through the first air inlet opening 111, the second air inlet opening 133, and the atomizing air inlet opening 236 successively to enter into the gap between the atomizing air inlet segment 234 of the second ventilation conduit 23 and the atomizing air outlet conduit 24 (i.e., the air inlet passage 201). Due to the obstruction of the atomizing air outlet conduit 24, the external air flows downwards to the bottom of the second ventilation conduit 23 and is adjacent to the atomizer head 22. And then the external air mixes with the smoke generated by the atomizer head 22. The mixture of the external air and the smoke enters into the inner cavity of the atomizing air outlet conduit 24 via the gap between the end of the atomizing air outlet conduit 24 and the atomizer head 22, flows upwards along the atomizing air outlet conduit 24, and enters into the atomizing air outlet segment 233. And, since the atomizing air outlet segment 233 communicates with the first through hole 61 of the mouthpiece 6, the atomizing air flows from the atomizing air outlet segment 233 into the first through hole 61 to be finally sucked out by the user.

Meanwhile, as the user sucks the mouthpiece 6, external air enters into the shell assembly 1 via the ventilation hole 121 on the bottom cover 12. Since there are no other exits, the air flows through the inner cavity of the first ventilation conduit 33 and the sleeve hole 35, enters into the second through hole 62, and is finally sucked out by the user. The airflow drives the power generation blade 32 to rotate before entering into the inner cavity of the first ventilation conduit 33, and the rotation of the power generation blade 32 drives the microgenerator 31 to generate electricity. The electricity generated by the microgenerator 31 is stored in the storage battery 4 which connected with the microgenerator 31. The power stored in the storage battery 4 can be provided to the atomizer head 22 for its operation when the user sucks the mouthpiece 6. The storage battery 4 can also be charged via the USB interface 54 when needed.

In the electronic cigarette according to the embodiment of the present disclosure, two independent airflow passages are provided. As the user sucks the mouthpiece in a normal case, the airflow passage passing through the atomizing assembly 2 is the atomizing passage 20, which generates smoke for smoking of the user. The other passage passing through the power generation assembly 3 is the power generation airflow passage 30, which utilizes the airflow generated as the user sucks the mouthpiece to drive the power generation blade 32 to rotate, and thus drive the microgenerator 31 to generate electricity to charge the storage battery 4. As a result, the object of recharging the battery and mitigating the power consumption of the battery is fulfilled. On the other hand, the air flows out from the second through hole 62 has a cooling effect on the smoke flowing out from the first through hole 61, so that the smoke provided to the mouth will not be too hot.

The above-described embodiments show only the method for implementing the present disclosure, and its descriptions are specific and detailed, but are not to be construed as limiting the scope of the disclosure. It should be noted that various modifications and improvements can be made by those skilled in the art without departing from the spirit of the disclosure, which should all fall within the scope of the present disclosure. Accordingly, the scope of the present disclosure should be determined by the appended claims.

The invention claimed is:

1. An electronic cigarette, comprising:
    a shell assembly;
    a power generation assembly mounted inside or outside the shell assembly; and
    a storage battery mounted inside the shell assembly,
    wherein the power generation assembly comprises a microgenerator electrically connected with the storage battery and a power generation blade mounted on the microgenerator; external air drives the power generation blade to rotate; the rotation of the power generation blade drives the microgenerator to generate electricity; and the electricity generated by the microgenerator is stored in the storage battery,
    wherein the power generation assembly is mounted inside the shell assembly, and further comprises a power generation airflow passage; the shell assembly defines a ventilation hole communicating with one end of the power generation airflow passage; both the microgenerator and the power generation blade are mounted inside one end of the power generation airflow passage proximal to the ventilation hole; and, external air flows into the one end of the power generation airflow passage via the ventilation hole to drive the rotation of the power generation blade and then flows out from the other end of the power generation airflow passage, and
    wherein the power generation assembly further comprises a first ventilation conduit which is arranged above the power generation blade and has an opening at one end directly facing the power generation blade; an inner cavity of the first ventilation conduit constitutes a part of the power generation airflow passage; the shell assembly comprises a housing and a bottom cover mounted at an end of the housing; the ventilation hole is defined on the bottom cover; and, both the power generation assembly and the storage battery are mounted inside the housing.

2. The electronic cigarette according to claim 1, wherein the shell assembly further comprises a connector located at an end of the housing opposite to the bottom cover and has a second mounting hole; and, an end of the first ventilation conduit opposite to the power generation blade is located in the second mounting hole.

3. The electronic cigarette according to claim 2, wherein the power generation assembly further comprises a sleeve mounted inside the second mounting hole; the end of the first ventilation conduit opposite to the power generation blade is located in the sleeve; and the sleeve defines a sleeve hole which communicates with the inner cavity of the first ventilation conduit.

4. The electronic cigarette according to claim 2, further comprising an atomizing assembly mounted inside the housing, wherein the atomizing assembly includes an atomizing passage spaced away from the power generation airflow passage and an atomizer head electrically connected with the storage battery; and, the atomizing passage comprises an air inlet passage and a smoke outlet passage, and both the air inlet passage and the smoke outlet passage communicate with the atomizer head.

5. The electronic cigarette according to claim 4, wherein the atomizing assembly further comprises:
    a second ventilation conduit, with a lower end connected with the atomizer head, an upper end connected to the connector, and an inner cavity consisting of an atomizing air outlet segment and an atomizing air inlet segment, wherein the atomizing air outlet segment is located above the atomizing air inlet segment; and,
    an atomizing air outlet conduit inserted in the second ventilation conduit;
    wherein, the atomizing air outlet segment communicates with the inner cavity of the atomizing air outlet conduit to define the smoke outlet passage, and the space between the atomizing air inlet segment and the atomizing air outlet conduit defines the air inlet passage.

6. The electronic cigarette according to claim 5, wherein the atomizing air inlet segment has a diameter larger than that of the atomizing air outlet segment; a connecting hole is defined at a junction of the atomizing air outlet segment and the atomizing air inlet segment; and, the atomizing air outlet conduit has one end mounted inside the connecting hole and the other end spaced away from the atomizer head.

7. The electronic cigarette according to claim 5, wherein the housing defines a first air inlet opening; the connector defines a second air inlet opening communicating with the first air inlet opening); and, the second ventilation conduit defines an atomizing air inlet opening which communicates with the second air inlet opening and the air inlet passage, respectively.

8. The electronic cigarette according to claim 5, further comprising a mouthpiece mounted on the housing, wherein the mouthpiece defines a first through hole and a second through hole spaced away from each other, the first through hole communicates with the atomizing air outlet segment of the second ventilation conduit, and the second through hole communicates with the inner hole of the first ventilation conduit.

9. An electronic cigarette, comprising:
- a power generation assembly, comprising:
  - a microgenerator,
  - a power generation blade mounted on the microgenerator, and
  - a power generation airflow passaged;
- a shell assembly configured to receive the power generation assembly and define a ventilation hole communicating with the one end of the power generation airflow passage, wherein both the microgenerator and the power generation blade are mounted inside one end of the power generation airflow passage; external air flows into the one end of the power generation airflow passage to drive a rotation of the power generation blade and then flows out from the other end of the power generation airflow passage; and, the rotation of the power generation blade drives the microgenerator to generate electricity, wherein the shell assembly comprises a housing and a bottom cover mounted at one end of the housing; the ventilation hole is defined on the bottom cover; the power generation assembly is mounted inside the housing, and wherein the power generation assembly further comprises a first ventilation conduit which is arranged above the power generation blade and has an opening at one end directly facing the power generation blade; an inner cavity of the first ventilation conduit constitutes a part of the power generation airflow passage.

10. The electronic cigarette according to claim 9, wherein the shell assembly further comprises a connector located at one end of the housing opposite to the bottom cover and provided with a second mounting hole; one end of the first ventilation conduit opposite to the power generation blade is located in the second mounting hole.

11. The electronic cigarette according to claim 9, further comprising a storage battery electrically connected to the microgenerator, wherein the electricity generated by the microgenerator is stored in the storage battery.

12. The electronic cigarette according to claim 11, further comprising an atomizing assembly, wherein the atomizing assembly includes an atomizing passage spaced away from the power generation airflow passage and an atomizer head electrically connected to the storage battery.

13. The electronic cigarette according to claim 12, wherein the atomizing passage comprises an air inlet passage and a smoke outlet passage; both the air inlet passage and the smoke outlet passage communicate with the atomizer head.

14. The electronic cigarette according to claim 12, further comprising a mouthpiece, wherein the mouthpiece defines a first through hole and a second through hole spaced away from each other; the first through hole communicates with the atomizing passage; and the second through hole communicates with the power generation airflow passage.

15. The electronic cigarette according to claim 12, further comprising an electronic control component electrically connected to the atomizing assembly and the storage battery.

* * * * *